No. 607,707. Patented July 19, 1898.
J. L. SCHARFF.
WINDOW GUARD.
(Application filed Oct. 27, 1897.)
(No Model.)
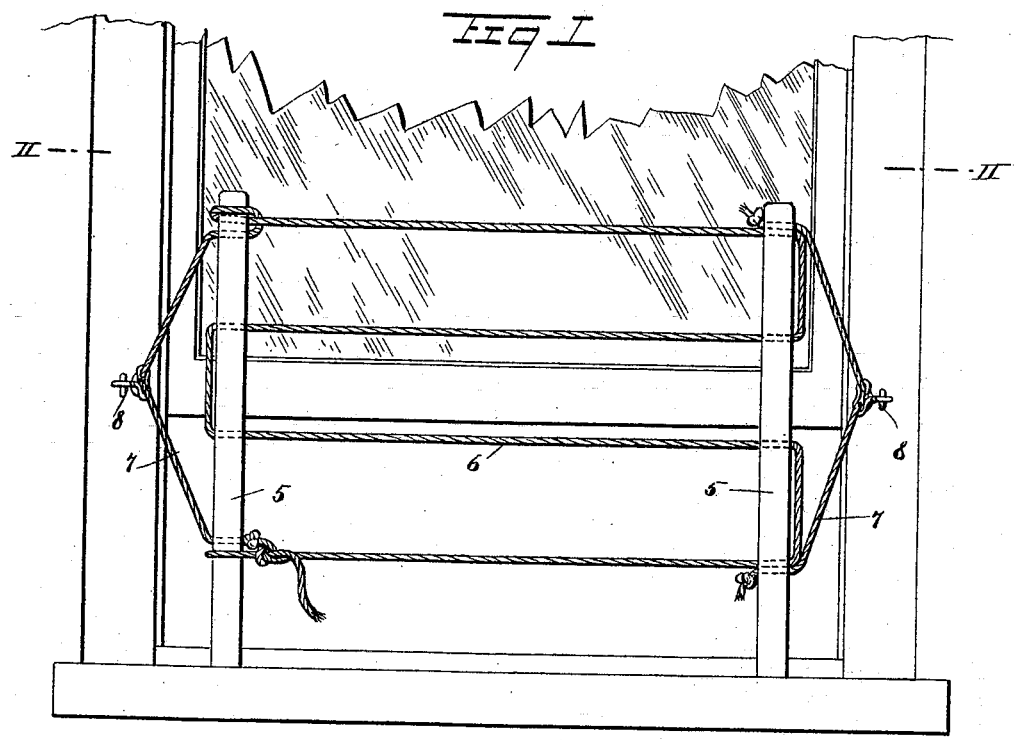
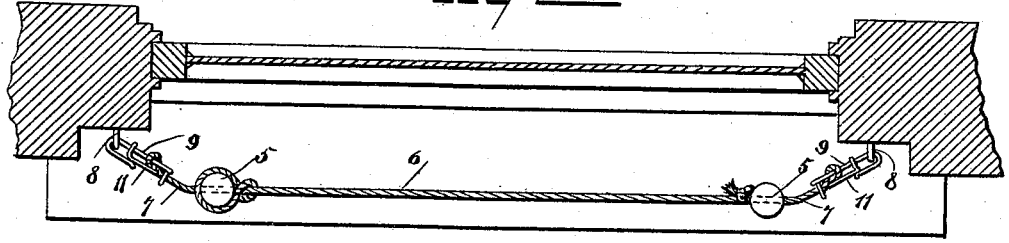
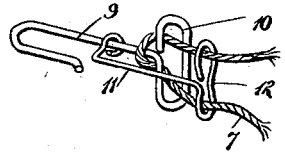
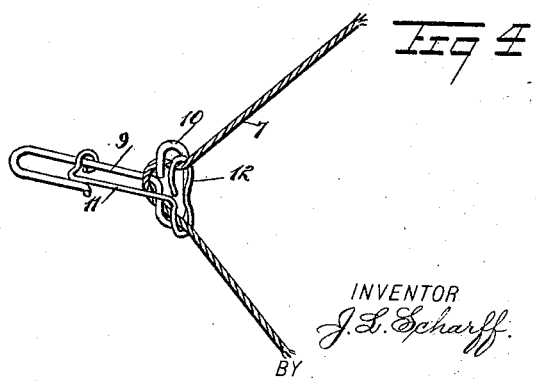
WITNESSES:
H. Walker
Isaac Osry
INVENTOR
J. L. Scharff
BY
ATTORNEYS.

UNITED STATES PATENT OFFICE

JOHN L. SCHARFF, OF READING, PENNSYLVANIA.

WINDOW-GUARD.

SPECIFICATION forming part of Letters Patent No. 607,707, dated July 19, 1898.

Application filed October 27, 1897. Serial No. 656,529. (No model.)

*To all whom it may concern:*

Be it known that I, JOHN L. SCHARFF, of Reading, in the county of Berks and State of Pennsylvania, have invented a new and Improved Window-Guard, of which the following is a full, clear, and exact description.

This invention is a device to be secured between the vertical portions of window-frames and at the outer side of the window, so that persons cleaning the window may be supported and prevented from falling.

This specification is the disclosure of one form of my invention, while the claims define the actual scope of the invention.

Reference is to be had to the accompanying drawings, forming a part of this specification, in which similar characters of reference indicate corresponding parts in all the figures.

Figure 1 is a front elevation of the invention. Fig. 2 is a sectional view on the line II II of Fig. 1. Fig. 3 is a perspective view of the automatically-closing hook, and Fig. 4 is a perspective view of the hook shown in a different position.

The guard has two posts 5, through openings in which a line 6 is rove. The line 6 is arranged to form parallel runs extending between the posts 5. The posts 5 are designed to rest at their lower ends on the window-sill, so as to extend upwardly and so as to hold the horizontal runs of the line 6 in front of the window and form a rest for the back of the person seated on the window-sill. This will effectually prevent the person from falling.

Each post 5 is provided with a bridle 7, which may be formed either of parts of the line 6 or of separate ropes attached to the posts. Each bridle 7 carries an automatically-locking hook by which the guard is attached to eyes 8 on the window-frame. These automatically-locking hooks consist of a hook member 9, having a transversely-elongated eye 10, through which a loop in the corresponding bridle 7 is passed, the bight of the loop being bent around the shank of the hook member, so that the hook member is securely attached to the bridle. A lock 11 is slidably connected with the shank of the member 9 and upon being moved in engagement with the hook of said member will securely close the open end of the hook, so as to prevent the hook from being removed from the eye 8. The rear end of the lock 11 has a transversely-elongated eye 12, through which the above-mentioned loop of the corresponding bridle 7 is passed. Now when the members of the said loop in the bridle are laid alongside of each other the eye 12 will not be forcibly engaged by the bridle, and consequently the lock may slide on the shank of the member 9 to engage and disengage the hook thereof. When, however, pressure is applied to the bridle, the members of the loop therein will be separated widely from each other, causing the lock 11 to be projected outward on the shank of the member 9, so as to close the open end of the hook. In this position the lock will be held until pressure on the bridle is relaxed. Fig. 3 shows the position of the lock when the bridle is not under strain, and Fig. 4 shows the position of the lock when the bridle is under strain.

The posts 5 being flexibly joined by the lines 6 and the posts being held by the bridles 7, the device combines the advantage of great strength and ease of use and adjustment. The lines and bridles, when properly trimmed and fastened, insure great strength, and their flexibility permits them to be easily adjusted to windows of any width and position.

Having thus described my invention, I claim as new and desire to secure by Letters Patent—

1. The combination of a hook member, having a hook proper and an eye, and a lock sliding on the hook member and capable of closing the open end of the hook, and also having an eye, the eye of the lock being juxtaposed to the eye of the hook member.

2. The combination of a hook member, and a lock sliding thereon, the lock having an eye capable of receiving a line in connection with the hook member.

3. In a window-guard, the combination of a post, a bridle attached thereto, a hook member having connection with the bridle by means of a loop therein, and a lock sliding on the hook member and having an elongated eye through which the loop of the bridle is passed.

JOHN L. SCHARFF.

Witnesses:
 W. Z. DECK,
 ELMER W. DECK.